United States Patent [19]

Tellier et al.

[11] 4,404,109
[45] Sep. 13, 1983

[54] AQUEOUS MICRO-EMULSIONS OF ORGANIC SUBSTANCES

[75] Inventors: Jacques Tellier; Claude Chambu, both of Billere; Jean-Francois Coste, Muret; Henri Grangette, Lyons, all of France

[73] Assignee: Societe Nationale Elf Aquitaine (Production), France

[21] Appl. No.: 201,384

[22] PCT Filed: Nov. 8, 1983

[86] PCT No.: PCT/FR79/00103
§ 371 Date: Jul. 13, 1980
§ 102(e) Date: Jul. 13, 1980

[87] PCT Pub. No.: WO80/00921
PCT Pub. Date: May 15, 1980

[30] Foreign Application Priority Data

Nov. 13, 1978 [FR] France ................................. 70 32005
Oct. 26, 1979 [FR] France ................................. 79 26600

[51] Int. Cl.³ ............................................. E21B 43/22
[52] U.S. Cl. ............................... 252/8.55 D; 166/275; 252/312; 252/356; 252/546; 260/404
[58] Field of Search .................... 252/8.55 D, 8.55 R, 252/356, 312; 166/275

[56] References Cited

U.S. PATENT DOCUMENTS

| | | | |
|---|---|---|---|
| 2,047,069 | 7/1936 | Hentrich et al. | 252/357 X |
| 3,074,980 | 1/1963 | Lorentzen | 260/404 |
| 3,500,912 | 3/1970 | Davis et al. | 252/312 X |
| 3,508,611 | 4/1970 | Davis et al. | 252/8.55 X |
| 3,536,136 | 10/1970 | Jones | 252/8.55 X |
| 3,766,266 | 10/1973 | Wakamatsu et al. | 562/518 |
| 4,264,515 | 4/1981 | Stern et al. | 260/404 |

FOREIGN PATENT DOCUMENTS

| | | |
|---|---|---|
| 2128862 | 10/1972 | France . |
| 2373328 | 7/1978 | France . |
| 2395252 | 1/1979 | France . |
| 1369462 | 9/1974 | United Kingdom . |

*Primary Examiner*—Herbert B. Guynn
*Attorney, Agent, or Firm*—Ostrolenk, Faber, Gerb & Soffen

[57] ABSTRACT

A new surface-active agent of the formula:

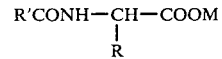

wherein R and R' are hydrocarbon groups, M being a cation it is particularly suitable for the production of microemulsions in the presence of aqueous saline solutions.

One important application thereof is in the assisted recovery of crude oil.

15 Claims, No Drawings

AQUEOUS MICRO-EMULSIONS OF ORGANIC SUBSTANCES

The invention concerns emulsions and particularly aqueous micro-emulsions of organic substances, and also the preparation thereof; it relates more particularly to new surface-active agents for use in such preparation.

Micro-emulsions, that is to say thermodynamically stable liquid dispersions having two phases, in which the dispersed liquid droplets generally measure less than 0.2 micron and more often about 0.01 to 0.1 micron, have various applications at the present time, one of the most important being the "assisted" tertiary recovery of crude oil. In this latter case, a micro-emulsion of water with hydrocarbon is injected into the well in order to remove the crude oil contained in the structure of the oil-bearing layer, by dissolving this oil in the micro-emulsion. The latter is prepared by mixing water with a hydrocarbon in the presence of a surface-active agent and an appropriate additive, usually an alcohol.

The invention is of particular interest in connection with the preparation of micro-emulsions of hydrocarbons with water of high salinity which is stable at high temperatures and which is absorbed to only a slight extent by rock.

It is known to use in processes for the tertiary recovery of hydrocarbons, additives which enable the interfacial surface tension between water and oil to be reduced. A number of compositions have already been proposed for this purpose. In known practice, the surface-active agents most commonly used for this purpose are sulphonates, in particular sulphonated cuts of crude oil, alkyl-aryl sulphonates of alkali metals or alkaline earth metals or ammonium salts; there substances are economic to use and are freely available. However, they have the disadvantage of losing their effectiveness when the salt-content in the water exceeds 30 g/liter (expressed as the equivalent of NaCl); since higher salt-contents are common in oil-bearing layers, this difficulty therefore limits the usefulness of petroleum sulphonates.

This has raised the problem of finding a composition containing a surface-active substance which will make it possible to obtain micro-emulsions of water containing monovalent and divalent ions at levels greater than 30 g/liter and hydrocarbons, and which will be chemically stable in use up to 100° C. and for four or five years, and which will have a low level of absorption by rocks and will be economic.

The present invention leads to an improvement in the technique in question; it makes possible the preparation of micro-emulsions which are stable in the conditions of salinity of the medium to be treated, even in the case of aqueous solutions having a concentration of salts which may reach 280 g or more of NaCl per liter, the content of $CaCl_2$ possibly exceeding 50 g/liter. The surface-active substances according to the invention enable the interfacial tension between water and crude oil to be substantially reduced. On the other hand, the invention makes it possible to obtain micro-emulsions in which the losses of surface-active agent by absorption on to the rocks are less than in previous practice. The consumption of surface-active substances, which are readily obtainable industrially, is thus reduced by the application of the invention. This constitutes a marked advantage as compared with the known art.

The process according to the invention, which consists in mixing one or more hydrocarbons with water, with a surface-active agent, with a co-agent and possibly with other additives in a manner known per se, is characterized in that the surface-active agent is constituted by one or more α-amino-acid salts of the type:

$$R'COHN-CH-COOM \qquad (1)$$
$$| \atop R$$

wherein each of the groups R and R' is a straight-chain or branched aliphatic group or an alkyl-aryl group, R being $C_6$ to $C_{120}$, preferably $C_{12}$ to $C_{60}$ and particularly $C_{16}$ to $C_{32}$, R' being $C_1$ to $C_{18}$ and M designating an alkali metal cation, an alkaline earth metal cation, ammonium, an amine group or hydrogen.

The radical R is preferably a relatively heavy alkyl radical, that is to say it contains at least 6 carbon atoms and particularly $C_{16}$ to $C_{32}$. The acyl group may be of a lower order, such as acetyl, propionyl or butyryl, but it may also be derived from a fatty acid, R' being $C_6$ or more, but preferably $C_1$ to $C_4$. Although the radicals R and R' are most commonly alkyl radicals, they can nevertheless be constituted by unsaturated hydrocarbon radicals, particularly alkenyl radicals. Thus the groups R may be formed by oligomeric olefin chains, particularly polyethylene, polypropylene, polybutylene and polyisobutylene; such a chain may contain for example 4 to 40 mono-olefin units. R can also be an alkyl-aryl radical.

By way of non-limitative example, the following are some of the salts which, in accordance with the invention, are suitable as emulsifiers and micro-emulsifiers:

potassium N-acetyl α-amino caprylate sodium N-butyryl α-amino decanoate,
diethylamine N-propionyl α-amino dodecanoate,
sodium N-acetyl α-amino dodecanoate,
ammonium N-octanoyl α-amino dodecanoate,
potassium N-acetyl α-amino tetradecanoate,
pyridinium N-caproyl α-amino tetradecanoate,
di-(N-propionyl α-amino hexadecanoate)diethylene diamine,
sodium N-acetyl α-amino oleate,
sodium N-acetyl α-amino octadecanoate,
isobutylamine N-acetyl α-amino linoleate,
calcium N-acetyl α-amino tetradecanoate,
sodium N-oleyl α-amino octadecanoate,
potassium N-linoleyl α-amino hexanoate The salts of the acids of formula (1) which can be used in accordance with the invention may be derived from any mineral or organic base, provided they are at least slightly soluble in water, in the chosen hydrocarbon or in both. In practice, the salts of the alkali metals are suitable, particularly potassium and sodium salts, and possibly the salts of alkaline earth metals. Ammonium salts may also be suitable, and also primary, secondary or tertiary amines, particularly methyl, ethyl, propyl, butyl and hexyl amines, ethylene diamine, diethylene triamine, propylene diamine, hexamethylene diamine, mono-, di- or tri-ethanolamine, pyridine, piperidine and piperazine, for example.

It is surprising that agents based on N-acyl α-amino carboxylic acids in accordance with the invention should be so effective for the preparation of micro-emulsions, when their isomers, which are proposed in U.S. Pat. No. 2,047,069 for the treatment of textiles, have not been suggested for this use. The isomers are defined by the formula:

$$R-CON-R_2COOX$$
$$|$$
$$R_1$$

wherein R is an alkyl radical having at least 7 carbon atoms, $R_1$ and $R_2$ are hydrocarbon radicals, which may be substituted, and X is hydrogen, ammonium or a metallic equivalent. Apart from the differences which there may be between the radicals R, $R_1$, $R_2$ according to U.S. Pat. No. 2,047,069 and the groups R, R' in the compounds of the present invention, a fundamental difference resides in the fact that in U.S. Pat. No. 2,047,069 the hydrocarbon substituent $R_1$ is attached to the nitrogen while in the compounds according to the invention, the group R is attached to a tertiary carbon atom; in fact, this latter carries three different substituent groups (N—, R and —COOM) together with a hydrogen atom, as shown by formula (1). The fact that this structural difference might lead to a molecule having such pronounced micro-emulsifying properties is novel and completely unexpected.

In carrying out the invention, the surface-active co-agent which dissolves and/or stabilizes the salt may be chosen from along those of the known art, particularly from among various alcohols. There is a vast choice in the class of alcohols, such as isopropyl, butyl, isobutyl, amyl, isoamyl, hexyl, heptyl, octyl, nonyl, decyl, dodecyl alcohols, ethylene glycol mono-butyl ether, ethylene glycol dibutyl-ether, various ethoxy alcohols, cyclohexanol, methylcyclohexanol, benzyl alcohol and others; this list is given solely by way of illustration and is not limitative in any way.

Although it would be possible to apply the surface-active agents used in the invention to systems of two liquid phases of very diverse chemical nature, the application to hydrocarbons is particularly important industrially. They could be used in the case of paraffins, olefins, naphthenes, aryls and other hydrocarbons, in particular those contained in crude oil or in the distillation fractions of the latter. They can also be applied to hydrocarbons obtained from the distillation of coal, tars, asphaltes and bitumens. In this way, emulsions can be prepared which serve for diverse coating purposes, for the water-proofing of fabrics, paper and wood for example, and for anti-parasite treatments in agriculture. Moreover, the surface-active agents of the invention are suitable for many other applications, for example for cosmetics compositions, in which case the organic substance to be emulsified may be a glyceride, lanolin or other substances; for the solubilization of aqueous dispersions of oil, in particular hydrocarbon slicks in the sea; for the incorporation in fuel of additives intended to increase the octane rating; for micellar catalysis or phase transfer; for putting into solution catalysts which are soluble in water but which are very slightly soluble in the organic phase to be treated; and for use as detergents for example.

The important application to the assisted recovery of crude oil, referred to above, uses micro-emulsion in which the hydrocarbon or hydrocarbons is or are of the type which are contained in crude oil.

According to the nature and the proportations of their components, the micro-emulsions formed with the salt of N-acyl α-amino acids may constitute a continuous hydrocarbon or aqueous phase, that is to say they may be of the W/O or O/W type.

The nature of the hydrocarbon and the possible salinity of the water also determine the proportions of surface-active agent which have to be employed in order to remain within the limits of stability of the micro-emulsion. It is not therefore possible to indicate a priori the quantity of N-acyl α-amino acid salt to be employed in a particular case. However, this quantity is usually, for micro-emulsions of aqueous saline solutions with paraffin hydrocarbons, about 0.5 to 30 parts by weight per 100 parts of micro-emulsified mixture; this proportion is in general of the order of 3 to 15 parts per 100 of the micro-emulsion, when the hydrocarbon and the water are present in equal quantities. Quantities less 5 percent, or even less than 3 percent, may be used when the group R of the surface-active agent is sufficiently heavy and one is working with optimum salinity.

The nature and proportions of the surface-active co-agent, in particular the various alcohols, are well known in the art and it is not necessary to specify them here; they are practically the same as for the surface-active agent according to the invention; thus in general, it is advantageous to use 50 to 150 parts by weight of alcohol for 100 parts of surface-active agent, according to the chemical nature and the viscosity of the hydrocarbon and the surface-active agent. Substantially equal quantities of alcohol and surface-active agent are quite satisfactory in many cases.

The micro-emulsions according to the invention can be obtained in a very wide range of proportions of hydrocarbon and water, in particular up to 80 parts of hydrocarbon per 100 parts of mixture of hydrocarbon plus water and in particular 20 to 80 parts hydrocarbon; the water may contain a greater or lesser amount of NaCl, $CaCl_2$ and/or other salts.

The invention is illustrated by the following non-limitative Examples. These Examples comprise series of preparations of micro-emulsions of dodecane with different proportions of aqueous saline solutions, by the addition of a surface-active agent in accordance with the invention, mixed with its own weight of 1-pentanol. Each of the preparations reported in the results is effected with the minimum of surface-active agent (TA) necessary to obtain a micro-emulsion which is stable at 20° C.; in other words, the parameters for each Example define the micro-emulsion limit.

The following abbreviations are used in the tables of results:

S.T.A.: surface-active solution
ES: salted water
D: dodecane
TA: surface-active agent in the micro-emulsion.

The alcohol, namely 1-pentanol, is not shown in the Tables, but it is present in all mixtures in a quantity equal to the quantity of TA. It is contained in STA. All the results are given in percent by weight.

EXAMPLES 1 to 7

The aqueous saline solution to be emulsified with dodecane contains 60 g NaCl per liter. The surface-active agent is sodium N-acetyl α-amino tetradecanoate:

$$CH_3CONH-CH-COONa$$
$$|$$
$$C_{12}H_{25}$$

which is used in the form of a solution containing 40% TA, 40% 1-pentanol and 20% non-salted water. The compositions for the limit of micro-emulsion are given in Table I.

TABLE I

| Example No. | 1 | 2 | 3 | 4 | 5 | 6 | 7 |
|---|---|---|---|---|---|---|---|
| ES | 60.4 | 52.3 | 42.9 | 38.3 | 33.8 | 21 | 14.3 |
| D | 18.9 | 22.7 | 28.2 | 30.8 | 33.5 | 48.2 | 59.2 |
| S.T.A. | 20.7 | 25 | 28.9 | 30.9 | 32.7 | 30.8 | 26.5 |
| TA | 8.3 | 10 | 11.6 | 12.4 | 13.1 | 12.3 | 10.6 |

EXAMPLES 8 to 15

The operations are carried out as in Examples 1 to 7, but with water containing 105 g of NaCl per liter. The results are summarized in Table II.

TABLE II

| Example No. | 8 | 9 | 10 | 11 | 12 | 13 | 14 | 15 |
|---|---|---|---|---|---|---|---|---|
| ES | 37.9 | 38 | 41.1 | 40.3 | 36.7 | 37.7 | 26.1 | 17.3 |
| D | 16.6 | 25 | 30.9 | 32.4 | 36.6 | 36.8 | 42.4 | 44.2 |
| S.T.A. | 45.5 | 37 | 28 | 27.3 | 26.7 | 25.2 | 31.5 | 33.5 |
| TA | 18.2 | 14.8 | 11.2 | 10.9 | 10.7 | 10.2 | 12.6 | 13.4 |

These results show that with 105 g of salt per liter of water, the surface-active agent according to the invention enables micro-emulsions to be obtained with a large range of proportions of hydrocarbon to water. It is only when the content of dodecane in the mixture falls to about 16% that it becomes necessary to increase the proportion of surface-active agent towards 18%; even with this proportion, the product is still economic.

EXAMPLES 16 to 20

Under the same conditions as in the preceding Examples, micro-emulsions are prepared using water containing 200 g NaCl per liter.

TABLE III

| Example No. | 16 | 17 | 18 | 19 | 20 |
|---|---|---|---|---|---|
| ES | 20.8 | 21.5 | 21.6 | 17.4 | 13 |
| D | 21.1 | 34.6 | 50.2 | 60 | 63.1 |
| S.T.A. | 58.1 | 43.9 | 28.2 | 22.6 | 23.9 |
| TA | 23.2 | 17.6 | 11.3 | 9 | 9.5 |

It should be noted that even with salt concentrations of as much as 200 g/liter, the surface-active agent according to the invention enables stable micro-emulsions to be obtained.

EXAMPLES 21 to 25

Preparations similar to those of Examples 1 to 7 are carried out, with the sole difference that the water contains per liter, 50 g NaCl and 10 g of CaCl$_2$.

The compositions at the limit of micro-emulsion are given in Table IV.

TABLE IV

| Example No. | 21 | 22 | 23 | 24 | 25 |
|---|---|---|---|---|---|
| ES | 43.6 | 45.4 | 34.6 | 26 | 17.8 |
| D | 20.2 | 28 | 34.8 | 39.3 | 52 |
| S.T.A. | 36.2 | 26.6 | 30.6 | 34.7 | 30.2 |
| TA | 14.5 | 10.6 | 12.2 | 13.8 | 12.1 |

These results show that in the case where the water contains sodium and calcium salts, the products according to the invention are perfectly viable.

EXAMPLES 26 to 31

The general mode of operation being the same as in the preceding Examples, the surface-active agent is sodium N-acetyl α-amino tetradecanoate and the water used contains per liter, 100 g NaCl and 20 g CaCl$_2$.

The results are given in Table V.

TABLE V

| Example No. | 26 | 27 | 28 | 29 | 30 | 31 |
|---|---|---|---|---|---|---|
| ES | 29.2 | 25.4 | 26.2 | 22.4 | 15.8 | 13.1 |
| D | 17.5 | 25.9 | 26.8 | 48.6 | 53.8 | 61.6 |
| S.T.A. | 53.3 | 48.7 | 47 | 29 | 30.4 | 25.3 |
| TA | 21.3 | 19.5 | 18.8 | 11.6 | 12.1 | 10.1 |

These results show that when the water contains a high proportion of NaCl, and also calcium salts, the quantities of surface-active agent which have to be used to obtain an emulsion remain at levels which are wholly acceptable from the economic point of view.

EXAMPLES 31 to 34

In the preparations according to the preceding Examples, the surface-active agent has been replaced by another, namely sodium N-acetyl α-amino octadecanoate:

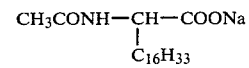

The surface-active solution contains 33.3% of sodium N-acetyl α-amino octadecanoate, 33.3% of 1-pentanol, and 33.3% water. The water contains 60 g of NaCl (per liter).

The results obtained are even better than in the preceding Examples, since about 5.5 to 7% of surface-active agent is sufficient in the mixture (always with the same amount of pentanol) to obtain stable micro-emulsions.

The compositions at the limit of micro-emulsion are given in Table VI.

TABLE VI

| Example No. | 31 | 32 | 33 | 34 |
|---|---|---|---|---|
| ES | 42.6 | 28 | 18.6 | 7.7 |
| D | 40.3 | 50.7 | 62.8 | 74.1 |
| S.T.A. | 17.1 | 21.3 | 18.6 | 18.2 |
| TA | 5.7 | 7.1 | 6.1 | 6.0 |

EXAMPLE 35

Replacement of the surface-active agent of Examples 1 to 7 by sodium N-acetyl-α-amino hexadecanoate:

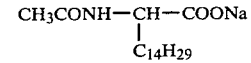

leads to similar results. For a mixture of 50 parts by weight of dodecane with 50 parts of water containing 60 g NaCl/liter, 6.5 parts of surface-active agent are sufficient for the formation of the stable micro-emulsion.

EXAMPLE 36

Tests similar to those of the preceding Examples have been carried out using pure non-saline water. These tests show that the surface-active agents according to the invention behave in the same manner in the absence of salts and enable micro-emulsions to be obtained in an economic manner.

Using a surface-active solution containing 40% of sodium N-acetyl-α-amino tetradecanoate, 40% of 1-pentanol and 20% water, there was obtained a micro-emulsion constituted by:

| | |
|---|---|
| water (non-saline) | 31% |
| dodecane | 31% |
| S.T.A. | 38% |
| as T.A. | 15.2% |

EXAMPLE 37

In a similar manner to the preceding Examples, a micro-emulsion has been obtained constituted by:

| | |
|---|---|
| water | 42% |
| dodecane | 25% |
| surface-active agent | 10% |
| co-agent | 22% |

In this Example, the surface-active agent is sodium N-acetyl α-amino tetradecanoate, and the co-agent is constituted by a mixture of 23% isopropanol, 38.5% octanol and 38.5% hexanol.

EXAMLE 38

Adsorption of surface-active agents on clay

With the object of comparing the adsorption by a clay of the surface-active agents described, with the adsorption of agents normally used in the recovery of oil by micro-emulsion, the following measurements are made.

To 100 g of a 0.5% aqueous solution of sodium N-acetyl α-amino tetradecanoate, there is added 5 g of bentonite which is stirred with the solution for 24 hours. The bentonite is then separated by centrifuging and is washed and dried and then titrated with nitrogen, a similar titration being carried out on the initial bentonite. An identical operation is carried out with a 0.5% solution of a petroleum sulphonate known by the name "TRS 16" (supplied by the WITCO company) as at present employed in the prior art. In this case, it is the sulphur which is titrated in the bentonite before and after treatment. Starting from the point at which there is an increase in the nitrogen content in the sample of bentonite which has been treated with tetradecanoate, the quantity of tetradecanoate which has been adsorbed is calculated. In the same way, the increase in the titre of sulphur in the bentonite which has been contacted with sulphonate, enables the adsorption of the latter to be evaluated. The adsorption tests are also carried out on rocks containing 5 to 10% clay.

Upon comparing the different analysis results, it is found that the surface-active agent of the invention absorbs about 30% less than in the prior art.

Careful choice of the conditions for preparing micro-emulsions with the surface-active agents according to the invention enables the proportion of the latter to be reduced below 5%. This can be seen from the results of the tests which are set out hereinafter.

The results in the Tables which follow have been obtained by mixing at 30° C. with light stirring:
- 47 volumes of aqueous saline, the NaCl content of which is indicated for each test;
- 47 volumes of a predetermined hydrocarbon;
- 3 volumes of alcohol, namely 2 volumes of 2-butanol and 1 volume of 3-methyl 1-butanol;
- 3 g (=3 volumes) of a surface-active agent, being the sodium salt of N-acyl α-amino acid:

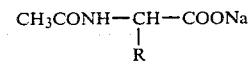

wherein R is a normal alkyl radical, the number of carbon atoms of which is given in the Tables.

TABLE VII

| | Optimum salinity of the water in g NaCl/liter. | | |
|---|---|---|---|
| | Hydrocarbon: | | |
| R of the surface-active agent | Octane | Decane | Dodecane |
| | | NaCl g/l | |
| $C_{12}$ | 220 | 250 | 280 |
| $C_{14}$ | 180 | 210 | 240 |
| $C_{16}$ | 110 | 135 | 165 |
| $C_{22}$ | 50 | 60 | 80 |

It will be seen that with dodecane, when R in the surface-active agent is lauryl, it is possible to work with water having 280 g NaCl/liter. Table VII also shows that a surface-active agent with R having $C_{22}$ is only compatible with the lower salinities of 50 to 80 NaCl g/l, but on the other hand, Table VIII shows that one then arrives at a parameter of maximum solubilization.

The parameter of solubilization is the volume of water of hydrocarbon solubilized by a unit volume of surface-active agent in the median phase of the micro-emulsion for optimum salinity. In the present tests, since there is 47 volumes of hydrocarbon and the same amount of aqueous saline for 3 volumes of surface-active agent, the maximum parameter of solubilization is 47.3=15.66; at this value the whole system forms a single emulsion phase.

TABLE VIII

| | Parameter of solubilization | | |
|---|---|---|---|
| R of the surface- | | Hydrocarbon: | |
| active agent | Octane | Decane | Dodecane |
| 12 | 5.5 | 4.0 | 3.5 |
| 14 | 11.0 | 7.5 | 6.0 |
| 16 | 15.5 | 15.5 | 11 |
| 22 | 15.5 | 15.5 | 15.5 |

These results show the importance of using long-chain surface-active agents since when R is $C_{16}$ octane and decane are wholly micro-emulsified and with $C_{22}$ all three hydrocarbons are wholly emulsified (value of 15.5).

These results are all the more remarkable in that the medium contains only 3% of surface-active agent as compared with more than 5%, and usually as much as 10 to 15%, which is necessary in the known micro-emulsion technique.

As is well known, the nature of the alcohols or other co-agents influences the results of emulsion; it is the same for the present invention.

It is also known that the temperature plays a role which can result in the inversion of an emulsion of micro-emulsion. Tables IX and X hereinafter show that the new surface-active agents according to the invention are very little influenced by variation in temperature.

TABLE IX

| Hydro-carbon: R | Optimum salinity of the water in g NaCl/liter at different temperatures | | | | | | | | |
|---|---|---|---|---|---|---|---|---|---|
| | Octane | | | Decane | | | Dodecane | | |
| | 30° C. | 60° C. | 85° C. | 30° C. | 60° C. | 85° C. | 30° C. | 60° C. | 85° C. |
| 12 | 220 | 200 | 210 | 250 | 240 | 240 | 280 | 255 | 255 |
| 14 | 180 | 170 | 165 | 210 | 200 | 195 | 240 | 220 | 220 |
| 16 | 110 | 115 | 110 | 135 | 125 | 120 | 165 | 145 | 150 |
| 22 | 50 | 45 | 40 | 60 | 55 | 55 | 80 | 75 | 70 |

A slight reduction in the optimum salinity is noted when the temperature is increased but often the differences are of the same order as the measurement errors (±10 g/l).

TABLE X

| Hydro-carbon: R | Parameters of solubilization as a function of temperature | | | | | | | | |
|---|---|---|---|---|---|---|---|---|---|
| | Octane | | | Decane | | | Dodecane | | |
| | 30° C. | 60° C. | 85° C. | 30° C. | 60° C. | 85° C. | 30° C. | 60° C. | 85° C. |
| 12 | 5.5 | 4.5 | 3.0 | 4.0 | 3.0 | 3.0 | 3.5 | 3.0 | 2.5 |
| 14 | 11.0 | 8.5 | 7.0 | 7.5 | 6.5 | 5.0 | 6.0 | 5.0 | 4.5 |
| 16 | 15.5 | 15.5 | 11.5 | 15.5 | 11.0 | 8.0 | 11.0 | 9.0 | 7.0 |
| 22 | 15.5 | 15.5 | 15.5 | 15.5 | 15.5 | 15.5 | 15.5 | 15.5 | 15.5 |

The important result from this Table is that with the surface-active agents according to the invention, neither the temperature nor the molecular mass of the hydrocarbon any longer prevents a single phase emulsion being obtained (parameter 15.5) if the radical R contains more than 16 carbon atoms.

The sodium salt of N-acetyl α-amino acid in which R is $C_{22}$, that is to say sodium N-acyl α-amino tetracosanoate was applied to the preparation of micro-emulsions of crude oil with aqueous saline. Two samples of American crude were tested, one from EXXON and one from the Storms Pool field (Illinois), each having two W/O (water/hydrocarbon) ratios 1 and 2. The operation was carried out at 45° C. with only 3% of surface-active agent and 3% of alcohols (2% of isoamyl alcohol +1% of 2-butanol). Table XI contains the results.

TABLE XI

| | Optimum Salinity g NaCl/l | Parameter of solubilization |
|---|---|---|
| EXXON crude: (API rating: 38; viscosity: 6 cp) | | |
| W/O = 1 | 60–80 | 15.5 |
| W/O = 2 | 60 | 15.5 |
| STORMS POOL crude: (API rating: 35; viscosity: 5.8 cp) | | |
| W/O = 1 | 75 | 15.5 |
| W/O = 2 | 60 | 15.5 |

In every case, a single micro-emulsion phase was obtained.

Similar results are obtained with the potassium, ammonium and propylamine salts of the N-acyl α-amino acids utilized above. The position in the same with the following surface-active agents:

sodium N-propionyl α-amino hexadecanoate,
magnesium N-butyryl α-amino hexadecanoate,
ammonium N-propionyl α-amino eicosanoate,
potassium N-butyryl α-amino triacontanoate, $$CH_3CONH-\underset{R}{CH}-COONa$$

in which the group R is an oligomer of propylene containing about 20 $CH_3CH=CH_2$ units.

TABLE XII

| Branched R of the surface-active agents | Optimum salinities of water in g NaCl/liter, for surface-active agents in which the R groups are branched | | |
|---|---|---|---|
| | Hydrocarbon: | | |
| | Octane | Decane | Dodecane |
| $C_{12}$ | 210 | 235 | 265 |
| $C_{14}$ | 170 | 200 | 225 |
| $C_{16}$ | 105 | 120 | 150 |
| $C_{22}$ | 40 | 55 | 70 |

Although the optimum salinities may be a little less for (branched) iso-compounds relatively to those of Table I, the branched agents are very satisfactory in use; they do not have any tendency to jellify and give high solubilization parameters.

Note: In this specification the expression "optimum salinity" refers to the percentages by weight of NaCl for which the interfacial surface tension between the hydrocarbon and water is least.

What is claimed is:

1. A process for the preparation of a micro-emulsion of hydrocarbon and water which contains at least 60 g of NaCl per liter by the addition of an effective surface active amount of a surface-active agent and a cosurfactant, wherein the said agent is a salt of an N-acyl α-amino acid which corresponds to the formula:

$$R'CONH-\underset{R}{CH}-COOM$$

wherein R and R' are straight-chain or branched aliphatic hydrocarbon radicals or alkyl-aryl radicals, R being $C_6$ to $C_{120}$, R' being $C_1$ to $C_{18}$ and M being an alkali metal cation, an alkaline earth metal cation, ammonium, an amine group or hydrogen.

2. A process according to claim 1, wherein the said agent is added in the proportion of 0.5 to 30 parts by weight per 100 parts of micro-emulsion.

3. A process according to claim 1, wherein the water used contains up to 280 g of NaCl per liter.

4. A process according to claim 3, wherein the water used contains up to 50 g of $CaCl_2$ per liter.

5. A process according to claim 1, wherein 20 to 80 parts by weight of hydrocarbon are used for, respectively 80 to 20 parts of water, and the cosurfactant is at least one alcohol in a proportion of 3 to 15 parts by weight per 100 parts of micro-emulsion.

6. A process according to claim 1, wherein R is a saturated or unsaturated chain having 12 to 60 carbon atoms.

7. A process according to claim 6 wherein said salt is an N-acetyl α-amino alkanoate of sodium or potassium, the alkane being $C_{16}$ to $C_{32}$.

8. A process according to claim 1, wherein the said agent is added in the proportion of 0.5 to 30 parts by weight per 100 parts of micro-emulsion.

9. A process according to claim 7, wherein the said agent is added in the proportion of 0.5 to 30 parts by weight per 100 parts of micro-emulsion.

10. A micro-emulsion comprising hydrocarbon, water which contains at least 60 g of NaCl per liter, and an effective surface-active amount of a surface-active agent which corresponds to the formula:

$$R'CONH-\underset{\underset{R}{|}}{CH}-COOM$$

wherein R and R' are straight-chain or branched aliphatic hydrocarbon radicals or alkyl-aryl radicals, R being $C_6$ to $C_{120}$, R' being $C_1$ to $C_{18}$ and M being an alkali metal cation, an alkaline earth metal cation, ammonium, an amine group or hydrogen, and an alcohol cosurfactant.

11. A micro-emulsion according to claim 10, which comprises 20 to 80 parts by weight of one or more hydrocarbons derived from oil, with respectively 80 to 20 parts by weight of water which contains up to 280 g of salt per liter, the content of N-acyl α-amino acid in the composition being from 3 to 25 percent by weight of the micro-emulsion.

12. A micro-emulsion according to claim 10, wherein R is a saturated or unsaturated chain having 12 to 60 carbon atoms.

13. A micro-emulsion according to claim 12, wherein said surface active agent is an N-acetyl α-amino alkanoate of sodium or potassium, the alkane being $C_{16}$ to $C_{32}$.

14. A micro-emulsion according to claim 12, which comprises 20 to 80 parts by weight of one or more hydrocarbons derived from oil, with respectively 80 to 20 parts by weight of water which contains up to 280 g of salt per liter, the content of N-acyl α-amino acid in the composition being from 3 to 25% by weight of the micro-emulsion.

15. A micro-emulsion according to claim 13, which comprises 20 to 80 parts by weight of one or more hydrocarbons derived from oil, with respectively 80 to 20 parts by weight of water which contains up to 280 g of salt per liter, the content of N-acyl α-amino acid in the composition being from 3 to 25% by weight of the micro-emulsion.

* * * * *

UNITED STATES PATENT AND TRADEMARK OFFICE
CERTIFICATE OF CORRECTION

PATENT NO. : 4,404,109

DATED : September 13, 1983

INVENTOR(S) : Jacques Tellier, et al

It is certified that error appears in the above-identified patent and that said Letters Patent are hereby corrected as shown below:

In the Patent Headings, in Heading 22, for "Nov. 8, 1983" read -- Nov. 8, 1979 --; and under Heading 30, for "70 32005" read -- 78 32005 --.

Column 1, line 35, for "there" read -- these --.

Column 9, line 2, for "of" read -- or --; line 65, for "in" read -- is --.

Column 10, line 66, for "1" read -- 6 --.

Signed and Sealed this

Third Day of January 1984

|SEAL|

Attest:

GERALD J. MOSSINGHOFF

Attesting Officer

Commissioner of Patents and Trademarks